United States Patent
Su et al.

(10) Patent No.: US 12,256,001 B2
(45) Date of Patent: Mar. 18, 2025

(54) METHOD OF DESIGNING ONE-WAY COMPUTATIONAL SYSTEM IN QAP-BASED HOMOMORPHIC ENCRYPTION

(71) Applicant: National Applied Research Laboratories, Hsinchu (TW)

(72) Inventors: Zheng-Yao Su, Hsinchu (TW); Ming-Chung Tsai, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 350 days.

(21) Appl. No.: 18/077,260

(22) Filed: Dec. 8, 2022

(65) Prior Publication Data

US 2023/0188342 A1 Jun. 15, 2023

Related U.S. Application Data (60) Provisional application No. 63/288,536, filed on Dec. 11, 2021.

(51) Int. Cl.
*H04L 9/30* (2006.01)
*H04L 9/00* (2022.01)
*H04L 9/08* (2006.01)

(52) U.S. Cl.
CPC ............ *H04L 9/3066* (2013.01); *H04L 9/008* (2013.01); *H04L 9/0825* (2013.01)

(58) Field of Classification Search
CPC ..... H04L 9/3066; H04L 9/008; H04L 9/0825; H04L 9/0852; H04L 9/3093
See application file for complete search history.

(56) References Cited

U.S. PATENT DOCUMENTS

| | | | |
|---|---|---|---|
| 9,942,040 B1 * | 4/2018 | Kalach | H04L 9/3093 |
| 2005/0152538 A1 * | 7/2005 | Stedron | G09C 1/02 |
| | | | 380/28 |

(Continued)

FOREIGN PATENT DOCUMENTS

| TW | 1807479 B | * 7/2023 |
|---|---|---|
| TW | 1826863 B | * 12/2023 |

(Continued)

OTHER PUBLICATIONS

Su et al. "Every Action in Every Code is Fault Tolerant: Fault Tolerance Quantum Computation in Quotient Algebra Partition." Dec. 5, 2019. (Year: 2019).*

*Primary Examiner* — Sarah Su
(74) *Attorney, Agent, or Firm* — Amin, Turocy & Watson, LLP (57) ABSTRACT

The present inventive concept discloses a method of designing a one-way computational system in QAP-based homomorphic encryption applied to the n-qubit encode operations of a k-qubit action M for public-key and semi-public-key schemes respectively, $n \geq k$, wherein the method comprises: preparing a tensor-product operator $\mathcal{M} = I_{2^{n-k}} \otimes M = \mathcal{M}_1 \mathcal{M}_2$ and decomposing it into two parts, wherein $\mathcal{M}$ is composed of elementary gates, and let $\mathcal{A} = \mathcal{M}_1^\dagger$ and $\mathcal{M}_2 = \mathcal{A}\mathcal{M}$; providing a correction operator, $\mathcal{B} = \mathcal{B}_1 \mathcal{B}_2$ for public-key and $\mathcal{B} = I_{2^k}$ for semi-public-key, and an encoding operator, $Q_{en}^\dagger V^\dagger = W_1 W_2$ for public-key and $Q_p^\dagger = W_1 W_2$ for semi-public-key, both composed of elementary gates; providing appropriate permutations P, $P_0$ and $P_1$, while $P_0 = P_1$ for semi-public-key, to obey the nilpotent condition $PW_1 P_0 = I$ for the identity operator; through process of merging operators according to sets of identities of gates, including Id-GateELIM, Id-GateEx and Id-GateREP, there obtain the mixed encode for public-key scheme, $U_{en} = P\mathcal{A}\mathcal{M} \mathcal{B} Q_{en}^\dagger V^\dagger = (P_1^\dagger W_1^\dagger \mathcal{M}_2 \mathcal{B}_1 W_1 P_1)(P_1^\dagger P_0)(P_0^\dagger W_1^\dagger$ (Continued)

$\mathcal{B}_2 W_1 P_0)(P_0^\dagger W_2)$, and that for semi-public key, $U_{en} = P \mathcal{A} M Q_p^\dagger = (P_0^\dagger W_1^\dagger \mathcal{M}_2 W_1 P_0)(P_0^\dagger W_2)$ with $n=k$, $\mathcal{B}_1 = \mathcal{B}_2 = I_{2^n}$ and $P_0 = P_1$.

20 Claims, 5 Drawing Sheets

(56) References Cited

U.S. PATENT DOCUMENTS

| | | | |
|---|---|---|---|
| 2019/0165936 A1* | 5/2019 | Brown | H04L 9/30 |
| 2023/0128727 A1* | 4/2023 | Su | H04L 9/008 |
| | | | 380/44 |
| 2023/0131601 A1* | 4/2023 | Su | H04L 9/3066 |
| | | | 380/44 |
| 2023/0188343 A1* | 6/2023 | Su | H04L 9/3093 |
| | | | 713/189 |
| 2023/0308424 A1* | 9/2023 | Nix | H04L 9/085 |

FOREIGN PATENT DOCUMENTS

| | | | |
|---|---|---|---|
| WO | WO-2018210895 A1 | * | 11/2018 |
| WO | WO-2024210231 A1 | * | 10/2024 |
| WO | WO-2024225497 A1 | * | 10/2024 |

* cited by examiner

FIG. 1 spinor $b_1 \quad b_1 \oplus a_1$
$b_2 \quad b_2 \oplus a_2$
$\cdots$
$b_n \quad b_n \oplus a_n$ $$S_\alpha^\zeta = S_{a_1}^{\varepsilon_1} \otimes S_{a_2}^{\varepsilon_2} \otimes \cdots \otimes S_{a_n}^{\varepsilon_n}$$

CNOT $a_i \quad a_i$
$a_j \quad a_j \oplus a_i$ $C_j^i$

Toffoli Gate $a_i \quad a_i$
$a_j \quad a_j$
$a_l \quad a_l \oplus (a_i \wedge a_j)$ $T_l^{ij}$

SWAP $a_i \quad a_j$
$a_j \quad a_i$ $P_{(ij)}$

Controlled SWAP $a_i \quad a_i$
$a_j \quad (a_j \wedge \bar{a}_i) \oplus (a_l \wedge a_i)$
$a_l \quad (a_l \wedge \bar{a}_i) \oplus (a_j \wedge a_i)$ $CS_{jl}^i$

Multi-Control Gate

$\tau \quad \tau + \omega \text{ or } \tau$

$\Lambda_{n-p}^{12\cdots p}(S_\omega^\pi)$

FIG. 2

Set 1: Id - GateELIM    Set 2: Id - GateEX    Set 3: Id - GateREP

1-1. $C_j^i C_j^i = I$ the identity

2-1. $C_j^i C_l^i = C_l^i C_j^i$

3-1. $P_{(i,j)} C_j^i P_{(i,j)} = C_i^j$

1-2. $P_{(i,j)} P_{(i,j)} = I$ the identity

2-2. $C_j^i C_j^l = C_j^l C_j^i$ 3-2. $P_{(j,l)} T_l^{ij} P_{(j,l)} = T_j^{il}$ 1-3. $T_l^{ij} T_l^{ij} = I$ the identity 2-3. $C_j^i T_m^{il} = T_m^{il} C_j^i$ 3-3. $P_{(i,j)} CS_{j,l}^i P_{(i,j)} = CS_{i,l}^j$ 1-4. $CS_{j,l}^i CS_{j,l}^i = I$ the identity

3-4. $C_2^1 C_3^1 \cdots C_{k+1}^1$
$= \Lambda_k^{(1)}(S_1^0 \otimes S_1^0 \otimes \cdots \otimes S_1^0)$

METHOD OF DESIGNING ONE-WAY COMPUTATIONAL SYSTEM IN QAP-BASED HOMOMORPHIC ENCRYPTION

RELATED APPLICATIONS

The present application claims the priority of U.S. Provisional Patent Application No. 63/288,536 filed on Dec. 11, 2021, the disclosure of which is hereby incorporated by reference herein in its entirety.

BACKGROUND OF THE INVENTION

1. Field of the Invention

The present disclosure generally relates to a method of designing a one-way computational system in quotient algebra partition-based homomorphic encryption (QAPHE), particularly, to a method of designing a one-way computational system in quotient algebra partition-based homomorphic encryption (QAPHE), which is based on the framework of quotient algebra partition (QAP) and the computation of homomorphic encryption (HE).

2. Description of the Related Art

Fully Homomorphic Encryption (HE) is commonly known as the Holy Grail of Encryption, which is a method that permits users to perform computations on encrypted data without first decrypting it, which highly improves the security level of data processing.

In the historical perspective, the concept of HE was firstly proposed by Rivest et al. in 1978 to provide a possible solution of conducting computations with no decryption. While, all attempts of achieving fully HE were unsuccessful over 30 years until the work given by C. Gentry in 2009. In his dissertation, a technique called bootstrapping is introduced in ideal lattices to reduce the noise occurring in each step of computation, an addition of a multiplication, on encrypted data, such that it is possible to attain unlimited computations homomorphically for each function. Yet, this technique is impractical because of the need of nearly infinite resources. As a consequence, many different methods are implemented to improve the approach of HE according to Gentry's work, such as relinearization and key switching.

Current schemes of HE are built on the so-called lattice-based cryptography, a class of post-quantum cryptosystems allowing to prevent data from attacks of quantum algorithms Although a lot of HE schemes have been proposed, it is implausible to claim that they approach the fully HE. One of major observations is that with the noise occurring in every step of computation, each method of noise reduction leads to approximated solutions, not exact ones, through a recursive process. On the other hand, an exponential overhead of computation is needed to reduce noises during the process. Thus, practical fully HE may not be attained through these strategies.

The current scheme of HE design cannot conduct blind evaluations without secret disclosure. The algorithms and operators are revealed during the computation. Besides, as mentioned above, it takes an extremely high cost of computation to reduce noises during the process to avoid too many errors.

Therefore, it is an urgent problem to be solved that how to provide a method of designing one-way computational system in QAP-based HE to rewrite the fault tolerant encode into a one-way mix form.

SUMMARY OF THE INVENTION

In light of solving the foregoing problems of the prior art, the present inventive concept provides a method of designing a one-way computational system in quotient algebra partition-based homomorphic encryption (QAPHE), which is based on the framework of quotient algebra partition (QAP) and the computation of homomorphic encryption (HE), wherein a fault tolerant encode of a k-qubit arithmetic operation, M, is constructed in a quantum code [n, k, C], wherein the method comprises:

- S1. decomposing a tensor-product operator, $\mathcal{M} = I_{2^{n-k}} \otimes M = \mathcal{M}_1 \mathcal{M}_2$, into two parts, wherein the tensor-product operator is composed of elementary gates, and let $\mathcal{A} = \mathcal{M}_1^\dagger$ and $\mathcal{M}_2 = \mathcal{A}\mathcal{M}$;
- S2. providing a correction operator $\mathcal{B}$, wherein the correction operator is composed of elementary gates, wherein the elementary gates comprise a set of identities, and the set of identities includes Id-GateELIM, Id-GateEx and Id-GateREP;
- S3. decomposing a modified encoding into two operators, $W_1$ and $W_2$;
- S4. obtaining a modified operator by applying the operator $W_1$ via the set of identities;
- S5. deriving a merging operator via the set of identities by choosing corresponding permutations, P, $P_0$ and $P_1$, wherein the merging operator satisfies the nilpotent condition; and a mixed modified operator is derived from the modified operator by the set of identities and the permutation; and
- S6. obtaining a one-way mixing encode by multiplying the merging operator and the mixed modified operator in the step of S5.

In an embodiment of the present inventive concept, the elementary gate comprises a spinor, a CNOT, a Toffoli Gate, a SWAP, a Controlled SWAP or a Multi-Controlled Gate.

In an embodiment of the present inventive concept, the correction operator according to the step of S2 is composed of the CNOT.

In an embodiment of the present inventive concept, the operator $W_1$ in the step of S3 comprises the SWAP and the operator $W_2$ is composed of the CNOT and the SWAP.

In an embodiment of the present inventive concept, the set of identities in the step of S4 is Id-GateREP.

In an embodiment of the present inventive concept, the one-way computational system designed by the method is applied to construct a public-key system in QAPHE.

In an embodiment of the present inventive concept, the step of S2 further comprises decomposing the correction operator into two components, which defines the correction operator $\mathcal{B} = \mathcal{B}_1 \mathcal{B}_2$, wherein any component of the correction operator is composed of the CNOT.

In an embodiment of the present inventive concept, the merging operator $\mathcal{M}_2\mathcal{B}_1$ is obtained by the set of identities of elementary gates, and the set of identities includes Id-GateELIM and Id-GateEx.

In an embodiment of the present inventive concept, according to the step of S3, wherein the modified encoding is defined as $Q_{en}^\dagger V^\dagger = W_1 W_2$.

In an embodiment of the present inventive concept, according to the step of S4, wherein two modified operators are obtained by applying the operator $W_1$ via the set of identities, wherein the two modified operators are $W_1^\dagger \mathcal{M}_2 \mathcal{B}_1 W_1$ and $W_{14}^\dagger \mathcal{B}_2 W_1$.

In an embodiment of the present inventive concept, according to the step of S5, wherein the mixed modified operators are $P_1^\dagger W_1^\dagger \mathcal{M}_2 \mathcal{B}_1 W_1 P_1$ and $P_0^\dagger W_1^\dagger \mathcal{B}_2 W_1 P_0$ via the set of identities of elementary gate which is Id-GateREP.

In an embodiment of the present inventive concept, according to the step of S5, wherein the merging operator is derived as $PW_1 P_1 = I_{2^n}$, $P_1^\dagger P_0$ or $P_0^\dagger W_2$ via Id-GateELIM, Id-GateEx and Id-GateREP.

In an embodiment of the present inventive concept, according to the step of S6, wherein the one-way mixing encode is $U_{en} = (P_1^\dagger W_1^\dagger \mathcal{M}_2 \mathcal{B}_1 W_1 P_1)(P_1^\dagger P_0)(P_0^\dagger W_1^\dagger \mathcal{B}_2 W_1 P_0)(P_0^\dagger W_2) = P \mathcal{A} \mathcal{M} \mathcal{B} Q_{en}^\dagger V^\dagger$.

In an embodiment of the present inventive concept, the one-way computational system designed by the method is applied to construct a semi-public-key system in QAPHE.

In an embodiment of the present inventive concept, the correction operator $\mathcal{B}$ is defined as $\mathcal{B} = I_{2^n}$.

In an embodiment of the present inventive concept, according to the step of S3, wherein the encoding is defined as $Q_P = W_1 W_2$.

In an embodiment of the present inventive concept, according to the step of S4, wherein a modified operator $W_1^\dagger \mathcal{M}_2 W_1$ is obtained by applying the operator $W_1$ via the set of identities.

In an embodiment of the present inventive concept, according to the step of S5, the mixed modified operator is $P_0^\dagger W_1^\dagger \mathcal{M}_2 W_1 P_0$ via the set of identities of elementary gate which is Id-GateREP.

In an embodiment of the present inventive concept, according to the step of S5, wherein the merging operator is derived as $PW_1 P_0 = I_{2^k}$ or $P_0^\dagger W_2$ via Id-GateELIM, Id-GateEx and Id-GateREP.

In an embodiment of the present inventive concept, according to the step of S6, wherein the one-way mixing encode is $U_{en} = (P_0^\dagger W_1^\dagger \mathcal{M}_2 W_1 P_0)(P_0^\dagger W_2) = P \mathcal{A} M Q_p^\dagger$.

All the operation process in the system is conducted by invertible gates designed dedicatedly in Hilbert space. Through some theoretical derivations and numerical experiments, compared to the existing HE computation, the present invention illustrates strong advantages over current schemes of HE computation, such as providing exact solutions instead of approximated ones, conducting blind evaluations without secret disclosures, and allowing problem-dependent optimizations with modest overheads.

BRIEF DESCRIPTION OF THE DRAWINGS

FIG. 2 is a library of elementary gates in QAPHE applied in the embodiment of the present inventive concept;

DETAILED DESCRIPTION

The present inventive concept is described by the following specific embodiments. Those with ordinary skills in the arts can readily understand other advantages and functions of the present inventive concept after reading the disclosure of this specification. Any changes or adjustments made to their relative relationships, without modifying the substantial technical contents, are also to be construed as within the range implementable by the present inventive concept.

Moreover, the word "exemplary" or "embodiment" is used herein to mean serving as an example, instance, or illustration. Any aspect or design described herein as exemplary or an embodiment is not necessarily to be construed as preferred or advantageous over other aspects or designs. Rather, use of the word "exemplary" or "embodiment" is intended to present concepts and techniques in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Another holy grail in the field of quantum information science is the realization of scalable fault tolerance quantum computation, which permits to protect quantum states from corruptions of errors due to computations or environments. The method of the present inventive concept is to construct fault tolerant encodes of every action in every error-correcting code. The success of this methodology is based on the framework Quotient Algebra Partition, QAP, whose partition structure is inherited by every stabilizer code. In the procedure of QAP-based Fault Tolerance Quantum Computation, QAPFTQC, a k-qubit state is encoded into an n-qubit codeword by an encoding in a QAP [n, k, C]. With an error appearing in the computation being represented by a spinor of a coset in [n, k, C], each corrupted state applied by a fault encode of this partition can be corrected by every member of the same coset. Meanwhile, it allows to design the dual process of QAPFTQC. That is, given a message state of k qubits, a k-qubit action M and a QAP [n, k, C], the encryption of message is conducted by an encoding and a random error, and the fault tolerant of M serves as the role of HE evaluation. Furthermore, the security is guaranteed by an exponential choices of errors in [n, k, C], which is post-quantum. The QAPHE is superior to current schemes of HE. In particular, since a computation is realized by rotations acting on the Hilbert space, each solution after an encoded computation is exact and requires small resources, achieving fully HE. In addition, the computation of QAPHE is blind and problem-dependently optimized because the rotations composing computation are all reversible and are admitted to mix up. Moreover, the quantum gates with one-way algorithm in the method of the present inventive concept make the scheme of QAPHE not only conductible on a quantum computer, but also achievable on a classical computer.

Figure 1:
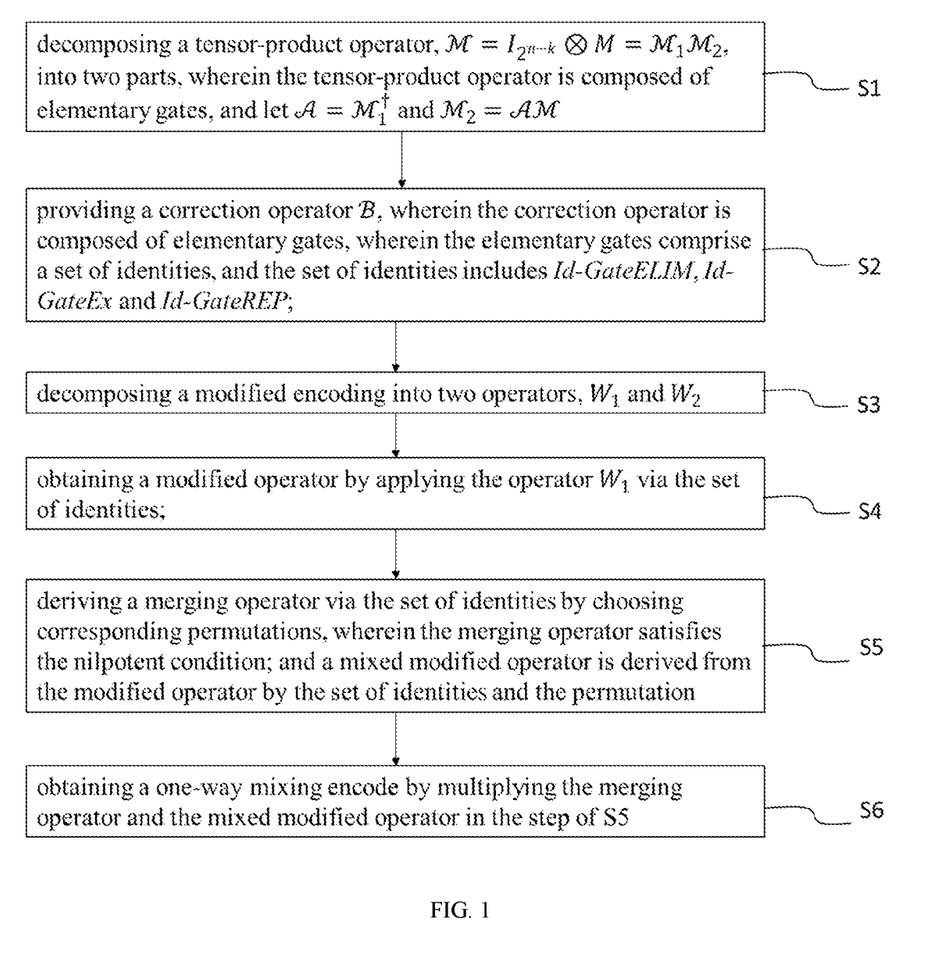
FIG. 1 is a flowchart of an embodiment of the method provided by the present inventive concept.

Please refer to FIG. 1 which is a library of elementary gates in QAPHE applied in the present inventive concept and FIG. 2 showing the diagrammatic illustrations of different sets of identities among elementary gates of the present inventive concept. The present inventive concept provides a method of designing a one-way computational system in quotient algebra partition-based homomorphic encryption (QAPHE), which is based on the framework of quotient algebra partition (QAP) and the computation of homomorphic encryption (HE), wherein a fault tolerant encode of a k-qubit arithmetic operation, M, is constructed in a quantum code [n, k, C]. The method comprises:

S1. decomposing a tensor-product operator, $\mathcal{M} = I_{2^{n-k}} \otimes M = \mathcal{M}_1 \mathcal{M}_2$, into two parts, wherein the tensor-product operator is composed of elementary gates, and let $\mathcal{A} = \mathcal{M}_1^\dagger$ and $\mathcal{M}_2 = \mathcal{A}\mathcal{M}$;

S2. providing a correction operator $\mathcal{B}$, wherein the correction operator is composed of elementary gates, wherein the elementary gates comprise a set of identities, and the set of identities includes Id-GateELIM, Id-GateEx and Id-GateREP;

S3. decomposing a modified encoding into two operators, $W_1$ and $W_2$;

S4. obtaining a modified operator by applying the operator $W_1$ via the set of identities;

S5. deriving a merging operator via the set of identities by choosing corresponding permutations, P, $P_0$ and $P_1$, wherein the merging operator satisfies the nilpotent condition; and a mixed modified operator is derived from the modified operator by the set of identities and the permutation; and S6. obtaining a one-way mixing encode by multiplying the merging operator and the mixed modified operator in the step of S5.

Please refer to FIGS. 1 and 2. In an embodiment of the present inventive concept, the elementary gate may comprise a spinor, a CNOT, a Toffoli Gate, a SWAP, a Controlled SWAP or a Multi-Controlled Gate, but not limited to. In this embodiment, i, j, l in FIG. 2 may fulfill 1≤i,j,l≤n.

Figure 3:
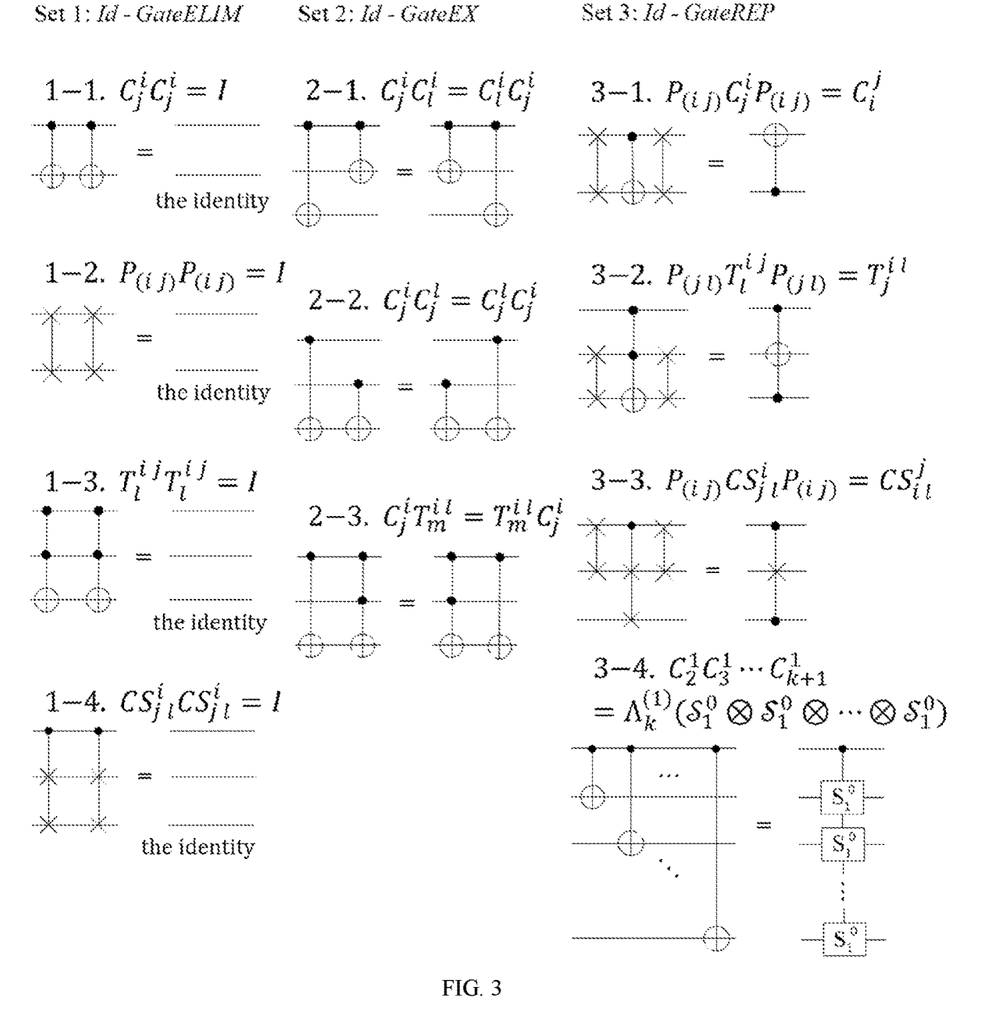
FIG. 3 is diagrammatic illustrations of different sets of identities among elementary gates of the present inventive concept.

Please refer to FIGS. 1 and 3. According to an embodiment of the present inventive concept, the elementary gates may comprise a set of identities, and the set of identities may include Id-GateELIM, Id-GateEx and Id-GateREP, but not limited to. In this embodiment, i, j, l in FIG. 3 may fulfill 1≤i,j,l≤n.

In an embodiment of the present inventive concept, the correction operator according to the step of S2 may be composed of the CNOT.

In an embodiment of the present inventive concept, the operator $W_1$ in the step of S3 may comprise the SWAP and the operator $W_2$ may be composed of the CNOT and the SWAP.

In an embodiment of the present inventive concept, the set of identities in the step of S4 may be Id-GateREP.

In an embodiment of the present inventive concept, the one-way computational system designed by the method may be applied to construct a public-key system in QAPHE.

In an embodiment of the present inventive concept applied to construct a public-key system, the step of S2 may further comprise decomposing the correction operator into two components, which defines the correction operator $\mathcal{B} = \mathcal{B}_1 \mathcal{B}_2$, wherein any component of the correction operator may be composed of the CNOT.

In a preferred embodiment of the present inventive concept, the merging operator $\mathcal{M}_2 \mathcal{B}_1$ may be obtained by the set of identities of elementary gates, and the set of identities may include Id-GateELIM and Id-GateEx.

In an embodiment of the present inventive concept applied to construct a public-key system, according to the step of S3, the modified encoding may be defined as $Q_{en}^\dagger V^\dagger = W_1 W_2$.

In an embodiment of the present inventive concept applied to construct a public-key system, according to the step of S4, wherein two modified operators may be obtained by applying the operator $W_1$ via the set of identities, wherein the two modified operators may be $W_1^\dagger \mathcal{M}_2 \mathcal{B}_1 W_1$ and $W_1^\dagger \mathcal{B}_2 W_1$.

In an embodiment of the present inventive concept applied to construct a public-key system, according to the step of S5, the mixed modified operator may be $P_1^\dagger W_1^\dagger \mathcal{M}_2 \mathcal{B}_1 W_1 P_1$ and $P_0^\dagger W_1^\dagger \mathcal{B}_2 W_1 P_0$ via the set of identities of elementary gates, wherein the set of identities of elementary gates may be Id-GateREP.

In an embodiment of the present inventive concept applied to construct a public-key system, according to the step of S5, wherein the merging operator may be derived as $PW_1 P_1 = I_{2^n}$, $P_1^\dagger P_0$ or $P_0^\dagger W_2$ via Id-GateELIM, Id-GateEx and Id-GateREP.

In an embodiment of the present inventive concept applied to construct a public-key system, according to the step of S6, wherein the one-way mixing encode may be $U_{en} = (P_1^\dagger W_1^\dagger \mathcal{M}_2 \mathcal{B}_1 W_1 P_1)(P_1^\dagger P_0)(P_0^\dagger W_1^\dagger \mathcal{B}_2 W_1 P_0)(P_0^\dagger W_2) = P\mathcal{A}\mathcal{M}\mathcal{B} Q_{en}^\dagger V^\dagger$.

In an embodiment of the present inventive concept, the one-way computational system designed by the method may be applied to construct a semi-public-key system in QAPHE.

In an embodiment of the present inventive concept applied to construct a semi-public-key system, the correction operator $\mathcal{B}$ may be defined as $\mathcal{B} = I_{2^n}$. In an embodiment of the present inventive concept applied to construct a semi-public-key system, according to the step of S3, wherein the modified encoding may be defined as $Q_p = W_1 W_2$.

In an embodiment of the present inventive concept applied to construct a semi-public-key system, according to the step of S4, wherein a modified operator $W_1^\dagger \mathcal{M}_2 W_1$ may be obtained by applying the operator $W_1$ via the set of identities.

In an embodiment of the present inventive concept applied to construct a semi-public-key system, according to the step of S5, the mixed modified operator may be $P_0^\dagger W_1^\dagger \mathcal{M}_2 W_1 P_0$ via the set of identities of elementary gates, wherein the set of identities of elementary gate may be Id-GateREP.

In an embodiment of the present inventive concept applied to construct a semi-public-key system, according to the step of S5, wherein the merging operator may be derived as $PW_1 P_0 = I_{2^k}$ or $P_0^\dagger W_2$ via Id-GateELIM, Id-GateEx and Id-GateREP.

In an embodiment of the present inventive concept applied to construct a semi-public-key system, according to the step of S6, wherein the one-way mixing encode may be $U_{en} = (P_0^\dagger W_1^\dagger \mathcal{M}_2 W_1 P_0)(P_0^\dagger W_2) = P\mathcal{A} M Q_p^\dagger$.

Figure 4A:
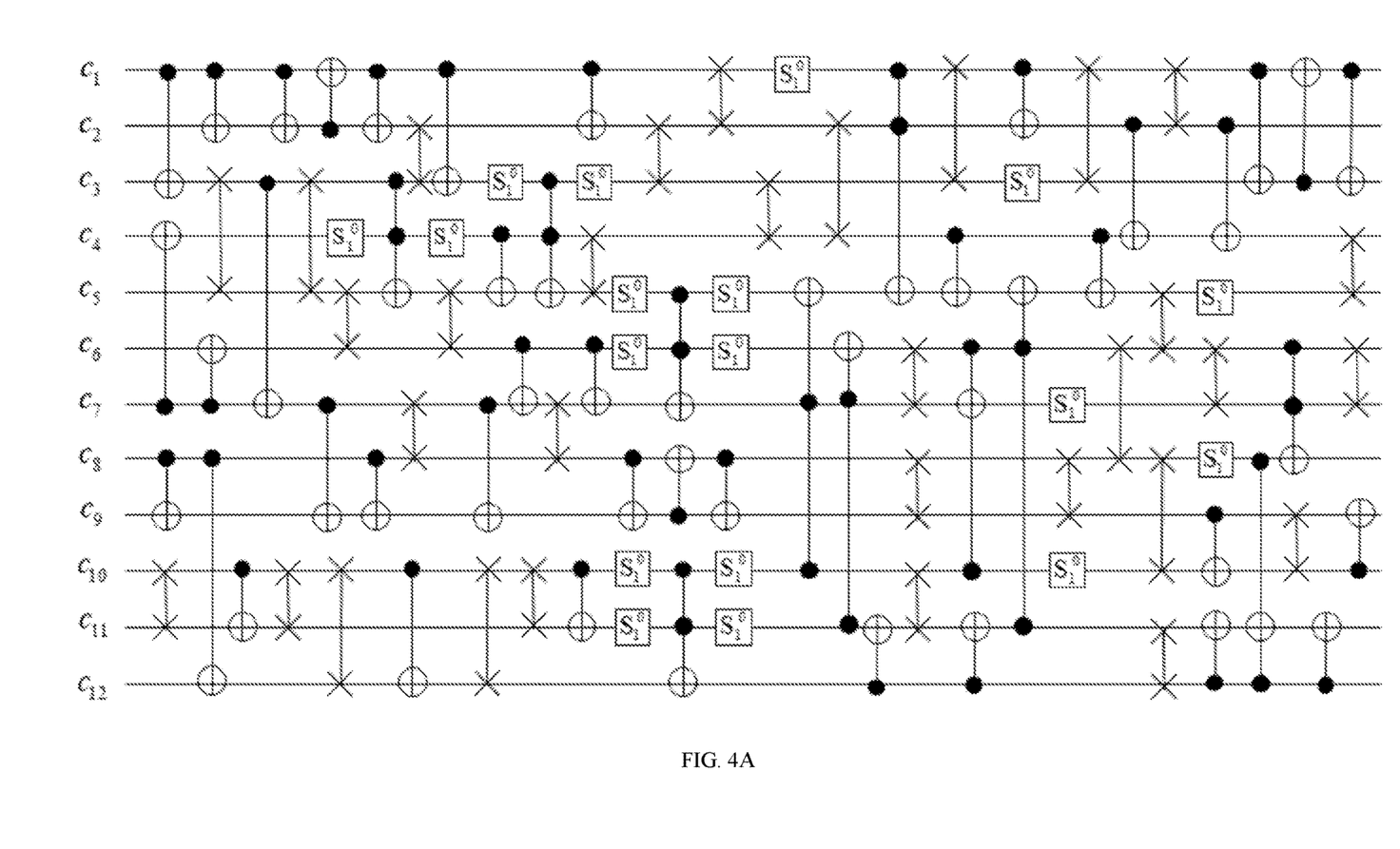
FIG. 4A is an illustration of a QAPHE circuit without the one-way algorithm of the method provided by the present inventive concept.
Figure 4B:
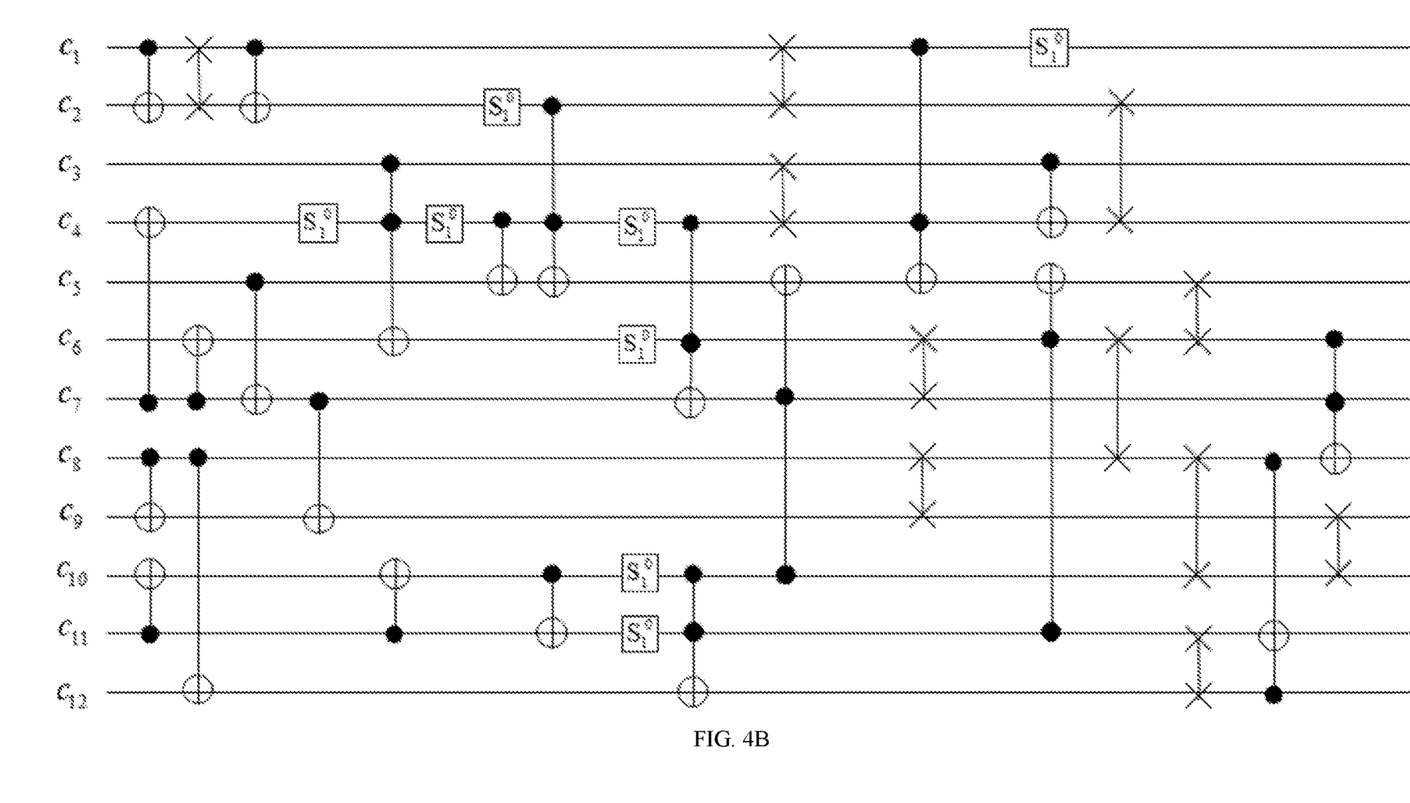
FIG. 4B is an illustration of a QAPHE circuit with the one-way algorithm of the method provided by the present inventive concept.

Please refer to FIGS. 4A and 4B. FIG. 4A is an illustration of a QAPHE circuit without the one-way algorithm of the method provided by the present inventive concept; and IG. 4B is an illustration of a QAPHE circuit with the one-way algorithm of the method provided by the present inventive concept. Compared to the circuit in FIG. 4A, the one in FIG. 4B reduces the computational depth and lowers the cost for fault tolerant computation as well. Specifically, by testing different computations, such as, but not limited to addition, subtraction, multiplication and division or comparison, the computational speed of the method with one-way algorithm provided by the present inventive concept are about 20% to 50% faster than that of the method of the prior art, which improves the HE computation performance.

According to the present inventive concept, a stabilizer code [n, k, C] with a stabilizer $C \subset su(2^n)$ is a quotient algebra partition $\{\mathcal{P}_Q(C)\}$. The quotient algebra partition is generated by the k-th maximal bi-subalgebra $C=\mathfrak{B}^{[k]}$ of a Cartan subalgebra in $su(2^n)$. Specifically, there exists an isomorphism between the stabilizer C of [n, k, C] under the multiplication and the k-th maximal bi-subalgebra $\mathfrak{B}^{[k]}$, i.e. $C=\mathfrak{B}^{[k]}$. Therefore, the stabilizer code [n, k, C] inherits the partition structure from the QAP $\{\mathcal{P}_Q(C)\}$. There is a duality between the n-qubit encrypted state in the Hilbert space and the partition structure [n, k, C] have duality, which verifies the orthogonality connecting spinors and the codewords. A significant concept of the coset spinor is illustrated in the QAP structure, which implies the n–s condition for the error-correctability in a QAP.

In the partition structure [n, k, C], an error set ε is correctable iff two arbitrary spinors of ε are either in different blocks or in a same coset of a block within this partition structure. Besides, there are two implications of the concept of the coset spinor, the correction equivalence and the code degeneracy. The former one indicates that an error may be corrected by any operator in the same coset and the latter one expresses that a correctable error set allows spinors in a same coset, thereby obtaining two immediate results. One is that if there is no spinor of the error set, ε, in the subspace, $\Gamma_0$–C, [n, k, C] may detect the error set ε; and the other one is that if two errors exist in different cosets of the same block, then the two errors in [n, k, C] are not correctable. Consequently, the n–s condition for the error-correctability is affirmed.

The partition structure [n, k, C] is regarded as a quantum version of the classical Hamming code [n, k]. For every classical linear code, [n, k], there exists an only partition structure [n, k, C] determined by the code. For every partition structure [n, k, C], there exists an only symplectic linear code [2n, n+k] determined by the partition structure. In the partition structure [n, k, C], it requires an encoding built by the partition structure in the intrinsic coordinate to encode a k-qubit state into an n-qubit codeword.

In the partition structure [n, k, C], an encoding $Q_{en} \in SU(2^n)$ is an n-qubit spinor-to-spinor mapping transforming [n, k, C] into an intrinsic coordinate [n, k, $\hat{C}$] generated by the intrinsic bi-subalgebra $\hat{C}=\{S_0^\zeta \otimes S_0^0: \zeta \in Z_2^{n-k}\}=Q_{en}CQ_{en}$. In the intrinsic coordinate, the partition structure [n, k, $\hat{C}$] is generated by the intrinsic bi-subalgebra $\hat{C}=\{S_0^\zeta \otimes s_0^0: \zeta \in Z_2^{n-k}\}$ that is the k-th maximal bi-subalgebra of the intrinsic Cartan subalgebra, $\mathfrak{C}_{[0]}$. In this partition structure, cosets of a block, $\widetilde{\Gamma_{\mathcal{T}}} = \cup_{\mu \in Z_2^{2k}} \widetilde{W_{\mathcal{T},\mu}}$, may be in the form of $\widetilde{W_{\mathcal{T},\mu}} = \{S_\mathcal{T}^\zeta \otimes S_\mathcal{K}^c: \zeta \in Z_2^{n-k}\}$. In fact, an encoding $Q_{en}$ is a QAP-preserving spinor-to-spinor transformation mapping the partition structure [n, k, C] into the intrinsic [n, k, $\hat{C}$]. In the partition structure [n, k, C], each fault tolerant encode, $U \in SU(2^n)$, requires meeting two standards, the eigen-invariance of $SU|\psi\rangle = U|\psi\rangle$ for each spinor $S \in C$ and each codeword, $|\psi\rangle$, and the error-correction against an error set ε wherein $US_\beta|\psi\rangle = \Sigma_{\alpha \in Z_2^{n-k}-\{0\}} S_{\alpha,v} U|\psi\rangle$ in each coset $W_{\alpha,v}$ from each block, $\Gamma_\alpha$, $v \in Z_2^{2k}$ and $S_\beta \in \varepsilon$.

To correct an error set $\varepsilon \subset su(2^n)$ with an encoding $Q_{en} \in SU(2^n)$ in the partition structure [n, k, C], a fault tolerant encode of the k-qubit operator $M \in SU(2^k)$ may be denoted as the form, $U_{en} = Q_{en} \mathcal{A} \mathcal{T} \mathcal{M} \mathcal{B} Q_{en}^\dagger$, where $\mathcal{M}$ is a tensor product of M and the (n–k)-qubit identity $I_{2^{n-k}}$, which may be expressed as $\mathcal{M} = I_{2^{n-k}} \otimes M$, where $\mathcal{B} \in SU(2^n)$ is an operator of input coset associated with ε, $\mathcal{A} \in SU(2^n)$ is an operation of an output coset and $\mathcal{T} \in SU(2^n)$ is a transfer amplitude.

Quantum Circuit

Basic arithmetic, such as addition and multiplication, are illustrated in the following details of quantum circuit.

Every finite field $F_q = F_p^m$ is composed of elements $q=p^m$ for a prime number p and a positive integer m. The finite field is isomorphic to the quotient ring $Z_p[x]/f(x)$ of a polynomial ring $Z_p[x]$ and an irreducible polynomial function $f(x)$ of degree m.

Currently, major post-quantum cryptosystems, such as lattice-based code system, code-based system and multivariate-based system, are described by polynomial rings, rather than linear operations. The QAP structure may be composed of operatees dual to states of a Hilbert space and allows applications of invertible linear transformations to these states inherently. This reveals essential differences between the solution of QAP-based HE and that based on a polynomial ring.

A quantum circuit exists to perform an addition $\Sigma_{i=1}^N m_i$ of a number N of 1-bit message $m_i \in Z_2^l$. For the addition of two 1-bit numbers, there is a more effective space-time implementation. For example, build a circuit with its linear size of O(l) in depth O(l) with O(l) ancilla qubit. Then, provide a circuit with its size of O(l) in logarithmic depth O(log l) with O(l/log l) ancilla qubit.

A quantum circuit exists to conduct a multiplication of two 1-bit numbers, which permits the circuit design of multiplying two numbers with lower cost. For example, the Karatsuba-based multiplication requires a circuit size $O(l^{log_2 3})$ with its depth of O(l) without ancilla qubit. It is worth noting that every quantum gate applied to the addition or multiplication may be factorized into a composition of s-rotations.

Construction of Public-Key Scheme

The solution based on the QAPHE in a public key system is illustrated as follows.

The scheme of QAPHE is a dual process of QAP-based Fault Tolerance Quantum Computation, QAPFTQC. Assuming that a number of N of plaintexts, $\{x_i \in Z_2^{k_i}: 1 \le i \le N\}$, are protected and proceeded in a cloud server, first, choose a partition structure [n, k, C] generated by the k-th maximal bi-subalgebra C of a Cartan subalgebra in $su(2^n)$ for the above purpose. Then, construct a fault tolerant encode in [n, k, C] according to the methodology of QAPFTQC to attain full homomorphism.

Three stages of a QAPHE over [n, k, C] are illustrated as follows, i.e., the encryption, the computation, and the decryption. In the stage of encryption, a message is going to be encoded by the public key. Every partition structure [n, k, C] makes the encrypted public key, $Key_{pub}$, transform a k-qubit plaintext into n-qubit ciphertext. In the partition structure [n, k, C]. The cost of encryption via a public key $Key_{pub}$ has an upper bound $O(n^2)$. The complexity of breaking the encryption via the public key $Key_{pub}$ has a lower bound $O(2^L)$ and an upper bound $O(2^{2n})$, where $\delta < L \le n-k$, and δ is a postquantum security level.

A k-qubit encoded state $|x\rangle$ is transformed to an n-qubit codeword $|\psi_{en}\rangle$ by a given public key $Key_{pub}$ in a partition structure, where $|\psi_{en}\rangle = EVQ_{en}|0\rangle \otimes |x\rangle$, $x \in Z_2^k$. The homomorphic computation of a k-qubit computation $M|x\rangle$ with an action M is realized by the fault tolerant encode $U_{en}$, where $M \in SU(2^k)$.

$$U_{en} = P \mathcal{A} \mathcal{M} \mathcal{B} Q_{en}^\dagger V^\dagger$$

$$= (PW_1 P_1)(P_1^\dagger W_1^\dagger \mathcal{A} \mathcal{M} \mathcal{B}_1 W_1 P_1)(P_1^\dagger P_0)(P_0^\dagger W_1^\dagger \mathcal{B}_2 W_1 P_0)(P_0^\dagger W_2) \quad \text{Eq. 1}$$

In the above Eq. 1, $\mathcal{M} = I_{2^{n-k}} \otimes M$ and $I_{2^{n-k}}$ is an (n–k)-qubit identity. The correction operation $\mathcal{B} = \mathcal{B}_1 \mathcal{B}_2$ is factorized into two operators $\mathcal{B}_1$ and $\mathcal{B}_2 \in SU(2^n)$. $Q_{en}^\dagger V^\dagger$, a product of two operators, $W_1$ and $W_2 \in SU(2^n)$, may be written as $Q_{en}^\dagger V^\dagger = W_1 W_2$. The four operators $\mathcal{A}, P, P_1$ and $P_0 \in SU(2^n)$ are chosen to mix up the encoded and $PW_1 P_1 = I_2^n$.

The practical application of $U_{en}$ is performed by the mixed composition of $2^{nd}$ line of Eq. 1. Specifically, each of $\mathcal{A}, P, P_1$ and $P_0$ is a composition of spinor-to-spinor s-rotations. Initially, the correction operator $\mathcal{B} = \mathcal{B}_1 \mathcal{B}_2$ is written as a product of two unitary actions, $\mathcal{B}_1$ and $\mathcal{B}_2$. The operator $\mathcal{A}$ is chosen to mix up the composition $\mathcal{M} \mathcal{B}_1$. By factorizing $Q_{en}^\dagger V^\dagger$ into two actions, $W_1$ and $W_2$, let the operator $W_1$ be conducted as in the $2^{nd}$ line of Eq. 1 and $W_2$ stays. The two unitary actions $P_1$ and $P_0$ are inserted into the components of Eq. 1 to further mingle quantum gates. $P_0^\dagger W_1^\dagger \mathcal{B}_2 W_1 P_0$ is a modified action of $\mathcal{B}_2$ by absorbing the spinor-to-spinor operation $W_1 P_0$. Similarly, $P_1^\dagger W_1^\dagger \mathcal{A} \mathcal{M} \mathcal{B}_1 W_1 P_1$ is a modified action of $\mathcal{A} \mathcal{M} \mathcal{B}_1$ by absorbing the spinor-to-spinor operation $W_1 P_1$.

It is worthy to note that the computation of $U_{en}$ admits optimized design according to the problem-dependent operation M.

The cost of encoding and the security of encryption will be shown as follows. In a partition structure [n, k, C], the cost of a homomorphic computation given by a public key has the upper bound $O(n^p)$ for an integer $p \in N$ and the complexity of breaking the encryption via the public key $Key_{pub}$ has a lower bound $O(2^L)$.

The decryption of an encoded computation $U_{en}|\psi\rangle$ is accomplished by the operation of a private key. In the present inventive concept, a fault tolerant encode $U_{en} = P \mathcal{A} \mathcal{M} \mathcal{B} Q_{en}^\dagger V^\dagger \in SU(2^n)$ of a k-qubit arithmetic operation, $M \in SU(2^k)$, and an n-qubit state $|\psi_{en}\rangle = \bar{E} V Q_{en}|0\rangle \otimes |x\rangle$ encoded by the public key $Key_{pub}$ are given. $\mathcal{M} = I_{2^{n-k}} \otimes M$, the homomorphic computation $U_{en}|\psi_{ed}\rangle$ is decrypted to $M|x\rangle$ via the private key $Key_{priv} = \mathcal{A} \backslash P \backslash$.

Notice that the scheme of public-key can be extended to the model of multi-party homomorphic encryption by appropriately increasing the numbers of data receivers, date providers, public keys, and computation providers.

Construction of Semi-Public-Key Scheme

The semi-public key scheme based on a QAPHE is illustrated in detail, which is almost the same as the public-key scheme except that a small resource of communication are allowed in the semi-public key scheme between the data receiver and data owner.

A k-qubit plaintext is encoded into a k-qubit cyphertext via the semi-public key $Key_{s-pub}$. The cost of encoding a k-qubit state via the semi-public key $Key_{s-pub}$ is O(k). The encryption of a k-qubit plaintext through a semi-public key is more efficient than that of the same plaintext via a public key because it is not necessary to add a random error in the semi-public key scheme. The complexity of breaking the encryption by a semi-public key $Key_{s-pub}$ is identical to that of finding the encoding operation from the encrypted message of this operation. It allows a very high level of post-quantum security with the cryptosystem chosen for $Q_p$, the semi-public-key scheme is more secure than the public-key scheme.

An encoding operator $Q_p \in SU(2^k)$ generated by a k-qubit semi-public key $Key_{s-pub}$. The homomorphic computation of a k-qubit evaluation conducted by an arithmetic operation $M \in SU(2^k)$ is realized by a fault tolerant encode $U_{en}$.

$$U_{en} = P \mathcal{A} M Q_p \backslash$$

$$= (P_0 \backslash W_1 \backslash \mathcal{A} M W_1 P_0)(P_0^\dagger W_2) \qquad \text{Eq. 2}$$

where $Q_p^\dagger$ is a product of two operators $W_1$ and $W_2 \in SU(2^k)$ and can be written as $Q_p^\dagger = W_1 W_2$. The three operators $\mathcal{A}, P$ and $P_0 \in SU(2^n)$ are used to mix up the encode and $PW_1 P_0 = I_{2^k}$. In the design of one-way function, the blindness of computation as of Eq. 2 is achievable, which is realized by merging and exchanging the given elementary gates. with n=k, $\mathcal{B}_1 = \mathcal{B}_2 = I_{2^n}$ and $P_0 = P_1$.

The cost of a homomorphic computation by a semi-public key of k qubits has the upper bound $O(k^t)$ for an integer $t \in N$. An overhead of error-correction is no need in the semi-public-key scheme, which implies a computational cost lower than that in the public-key setting. The complexity of breaking a homomorphic computation by a semi-public key of k qubits is limited by $v(k) = (k^e/(r-d))^{r-d} + k^{2d}$, d, e and $r \in N$.

An encoded operation $U_{en} = P \mathcal{A} M \mathcal{B} Q_p^\dagger \in SU(2^n)$ of a k-qubit arithmetic operation $M \in SU(2^k)$ and n k-qubit state $|\psi_{en}\rangle = Q_p |x\rangle$ encoded by a semi-public key $Key_{s-pub}$ are given. The homomorphic computation $U_{en}|\psi_{ed}\rangle$ is decrypted to $M|x\rangle$ by the private key $Key_{priv} = \mathcal{A} \backslash P \backslash$.

Similar to the public-key scheme, the concept of multi-party is applicable to the semi-public-key by increasing the numbers of data receivers, data providers, and computation providers, where a single semi-public key is adopted to produce multiple encoding operators for multiple users.

Example of the Public Key Encryption

The following illustrates that the feature "every partition structure [n, k, C] makes the encrypted public key, $Key_{pub}$, transform a k-qubit plaintext into n-qubit ciphertext. In the partition structure [n, k, C]" of the present inventive concept is feasible. Various types of designs of public-key encryptions are permitted in the framework of QAP according to distinct difficult problems. In the following, two designs of encryptions are demonstrated.

In a partition structure [n, k, C] with an encoding $Q_{en}$, it allows a public key of encryption consisting of an operation $V Q_{en}$ and an error generator $Gen(\bar{\varepsilon}; J)$ associated with a set $\bar{\varepsilon} = \{\bar{E}_r = V E_r V^\dagger: r=1, 2, \ldots J\}$ of $J < n-k$ errors, where $V Q_{en} \in SU(2^n)$ is a spinor-to-spinor transformation, spinors, V is a qubit permutation. The spinors $E_r \in su(2^n)$ are selected from independent blocks in the partition structure, respectively. $Gen(\bar{\varepsilon}; J)$ can generate an error $\bar{E} = (\bar{E_1})^{\epsilon_1} (\bar{E_2})^{\epsilon_2} \ldots (\bar{E_J})^{\epsilon_J}$ randomly from $\varepsilon$ with $(\bar{E}_r)^0 = I_{2^n}$ and $(\bar{E}_r)^1 = \bar{E}_r$, $\epsilon_r \in Z_2$. The error $\bar{E} = (\bar{E_1})^{\epsilon_1} (\bar{E_2})^{\epsilon_2} \ldots (\bar{E_J})^{\epsilon_J}$ may be a product by a certain number of spinors randomly chosen from $\bar{\varepsilon}$. The public key can be written as Eq. 3 below.

$$Key_{pub}^{(1)} = (V Q_{en}, Gen(\bar{\varepsilon}; J)) \qquad \text{Eq. 3}$$

Supposed that a number of 1-qubit message $x_i \in Z_2^l$ is N, an $l_0$-qubit blank state $|x_0\rangle$ is expressed into a k-qubit basis state by $k = l_0 + lN$, which is $|x\rangle = |x_1\rangle \otimes |x_2\rangle \ldots |x_N\rangle \otimes |x\rangle$. The form of the encoded state is $|\psi_{en}\rangle = \bar{E} V Q_{en}|0\rangle \otimes |x\rangle$ by writing the tensor product state $|0\rangle \otimes |x\rangle$ for the n–k qubit basic state $|0\rangle$.

The cost of encoding a plaintext x to the ciphertext $|\psi_{en}\rangle$ equals $|V||Q_{en}|+1$, where $|V| \sim O(nk)$ and $|Q_{en}| \sim O(n(n-k))$ are the numbers of 1- and 2-qubit s-rotations, respectively, in V and $Q_{en}$, and the number 1 is counted with the application of $\bar{E}$.

The complexity of breaking the encryption by the public key $\text{Key}_{pub}^{(1)}$ is the number of the steps to find the error $E=(\overline{E}_1)^{\epsilon_1}(\overline{E}_2)^{\epsilon_2}\ldots(\overline{E}_J)^{\epsilon_J}$ in the codeword $|\psi_{en}\rangle = EVQ_{en}|0\rangle \otimes |x\rangle$, where $\epsilon_r \in Z_2$ and $1 \leq r \leq J$. A brute force attack leads to the upper bound $2^J$, hich is the number of all possibilities of the J-bits $\epsilon_r$. On the other hand, the cost of finding $\overline{E}$ is equivalent to that of the problem of searching the representation of $\overline{E}$ in terms of spinors in a subset $S_G=\{\overline{E}_r: 1 \leq r \leq J\}$ of a finite abelian group $G=\text{span}S_G$ with its size $2^J$. It takes a complexity is larger than or equals to $2^{J/2+1}$ and has a lower bound $O(2^{J/2})$.

In the known cryptosystem in code-based cryptography, the Muceliece cryptosystem, adopts a Goppa code [n, k] to corrects errors of weight $$t = \left\lceil \frac{n}{\log n} \right\rceil.$$

In this system, given a public key $\hat{G} \in Z_2^{k \times n}$, t, a message $x \in Z_2^k$ is encrypted to a cyphertext $c=x\hat{G}+e$ by multiplying $\hat{G}$ and adding a randomly chosen error $e$ of weight $t$. Through a generic attack called information-set decoding, the complexity of restoring $x$ from $c$ is approximately $y^{n/\log n}$, $y=(1-k/n)^{1-k/n}$.

In a partition structure [n, k, C] with an encoding $Q_{en}$, a public key of encryption is allowed to be composed of the operation $VQ_{en}$ and an error generator $\text{Gen}(R_1, R_2; J)$, where $V \in SU(2^n)$ is s spinor-to-spinor transformation. $\text{Gen}(R_1,R_2; J)$ can generate an error $\overline{E}=S_\gamma^\xi \in su(2^n)$ randomly that is a solution of two sets of relations $R_{q=1,2}=\{\xi\cdot\zeta_{q,u_q}+\alpha_{q,u_q}\cdot\gamma=0: 1\leq u_q \leq 2n-J_q\}$, $j_g<n-k$. Each set of $R_q$ is associated with a bi-subalgebra $\mathcal{B}_q \subset su(2^n)$ sizing $2^{J_q}$ and comprising spinors from different blocks in the partition structure, respectively. The intersection $\mathcal{B}=\mathcal{B}_1 \cap \mathcal{B}_2$ forms a bi-subalgebra of size $2^J$, $J<J_q$. The public key is written as Eq. 4.

$$\text{Key}_{pub}^{(2)}=(VQ_{en},\text{Gen}(R_1,R_2;J)) \quad \text{Eq. 4}$$

The cost of encoding a plaintext $x$ to the ciphertext $|\psi_{en}\rangle$ equals $|V||Q_{en}|+1$, where $|V| \sim O(nk)$ and $|Q_{en}| \sim O(n(n-k))$ are the numbers of 1- and 2-qubit s-rotations, respectively, in $V$ and $Q_{en}$, and the number 1 is counted with the application of $\overline{E}$. The complexity of the security of this encryption is the number of the steps to solve the group intersection problem, which has a lower bound $O(2^{J/2})$ and an upper bound $O(2^J)$.

The present inventive concept illustrates a one-way algorithm based on QAPHE, which may rewrite the original form of the fault tolerant operation $U_{en}=\mathcal{P}\mathcal{A}\mathcal{M}\mathcal{B}Q_{en}^\dagger V^\dagger$ into a one-way mix form and be applied to the algorithm with the public-key scheme and the semi-public key scheme based on QAPHE. Briefly, because the computation may be constructed by well-designed and invertible elementary gates on the Hilbert Space, the computation provides the exact answer and naturally achieves fully HE according to the method provided by the present inventive concept. The ongoing computation can be hidden by the merge and exchange among the elementary gates, which enhances the security level of information processing and allows problem-dependent optimizations with modest overheads. Moreover, the quantum gates with one-way algorithm in the method of the present inventive concept make the scheme of QAPHE not only conductible on a quantum computer, but also achievable on a classical computer.

The foregoing descriptions of the detailed embodiments are only illustrated to disclose the features and functions of the present inventive concept and not restrictive of the scope of the present inventive concept. It should be understood to those in the art that all modifications and variations according to the spirit and principle in the disclosure of the present inventive concept should fall within the scope of the appended claims.

What is claimed is:

1. A method of designing a one-way computational system in quotient algebra partition-based homomorphic encryption (QAPHE), which is based on the framework of quotient algebra partition (QAP) and the computation of homomorphic encryption (HE), wherein a fault tolerant encode of a k-qubit arithmetic operation, M, is constructed in a quantum code [n, k, C], wherein the method comprises:

S1. decomposing a tensor-product operator, $\mathcal{M}=I_{2^{n-k}} \otimes M = \mathcal{M}_1\mathcal{M}_2$, into two parts, wherein the tensor-product operator is composed of elementary gates, and let $\mathcal{A}=\mathcal{M}_1^\dagger$ and $\mathcal{M}_2=\mathcal{A}\mathcal{M}$;

S2. providing a correction operator $\mathcal{B}$, wherein the correction operator is composed of elementary gates, wherein the elementary gates comprise a set of identities, and the set of identities includes Id-GateELIM, Id-GateEx and Id-GateREP;

S3. decomposing a modified encoding into two operators, $W_1$ and $W_2$;

S4. obtaining a modified operator by applying the operator $W_1$ via the set of identities;

S5. deriving a merging operator via the set of identities by choosing corresponding permutations, P, $P_0$ and $P_1$, wherein the merging operator satisfies the nilpotent condition; and a mixed modified operator is derived from the modified operator by the set of identities and the permutation; and S6. obtaining a one-way mixing encode by multiplying the merging operator and the mixed modified operator in the step of S5.

2. The method of claim 1, wherein the elementary gate comprises a spinor, a CNOT, a Toffoli Gate, a SWAP, a Controlled SWAP or a Multi-Controlled Gate.

3. The method of claim 2, wherein the correction operator according to the step of S2 is composed of the CNOT.

4. The method of claim 2, wherein the operator $W_1$ in the step of S3 comprises the SWAP and the operator $W_2$ is composed of the CNOT and the SWAP.

5. The method of claim 1, wherein the set of identities in the step of S4 is Id-GateREP.

6. The method of claim 1, wherein the one-way computational system designed by the method is applied to construct a public-key system in QAPHE.

7. The method of claim 6, wherein the step of S2 further comprises decomposing the correction operator into two components, which defines the correction operator $\mathcal{B}=\mathcal{B}_1\mathcal{B}_2$, wherein any component of the correction operator is composed of the CNOT.

8. The method of claim 7, wherein the merging operator $\mathcal{M}_2\mathcal{B}_1$ is obtained by the set of identities of elementary gates, and the set of identities includes Id-GateELIM and Id-GateEx.

9. The method of claim 6, according to the step of S3, wherein the modified encoding is defined as $Q_{en}^\dagger V^\dagger = W_1W_2$.

10. The method of claim 6, according to the step of S4, wherein two modified operators are obtained by applying the operator $W_1$ via the set of identities, wherein the two modified operators are $W_1^\dagger \mathcal{M}_2\mathcal{B}_1 W_1$ and $W_1^\dagger\mathcal{B}_2W_1$.

11. The method of claim 6, according to the step of S5, wherein the mixed modified operators are $P_1^\dagger W_1^\dagger \mathcal{M}_2$ $\mathcal{B}_1 W_1 P_1$ and $P_0^\dagger W_1^\dagger \mathcal{B}_2 W_1 P_0$, and the mixed modified operators are derived via the set of identities of elementary gate which is Id-GateREP.

12. The method of claim 6, according to the step of S5, wherein the merging operator is derived as $PW_1 P_1 = I_{2^n}$, $P_1^\dagger P_0$ or $P_0^\dagger W_2$ via Id-GateELIM, Id-GateEx and Id-GateREP.

13. The method of claim 6, according to the step of S6, wherein the one-way mixing encode is $U_{en} = (P_1^\dagger W_1^\dagger \mathcal{M}_2 \mathcal{B}_1 W_1 P_1)(P_1^\dagger P_0)(P_0^\dagger W_1^\dagger \mathcal{B}_2 W_1 P_0)(P_0^\dagger W_2) = P \mathcal{A} \mathcal{M} \mathcal{B} Q_{en}^\dagger V^\dagger$.

14. The method of claim 1, wherein the one-way computational system designed by the method is applied to construct a semi-public-key system in QAPHE.

15. The method of claim 14, wherein the correction operator $\mathcal{B}$ is defined as $\mathcal{B} = I_{2^n}$.

16. The method of claim 14, according to the step of S3, wherein the encoding is defined as $Q_P = W_1 W_2$.

17. The method of claim 14, according to the step of S4, wherein a modified operator $W_1^\dagger \mathcal{M}_2 W_1$ is obtained by applying the operator $W_1$ via the set of identities.

18. The method of claim 14, according to the step of S5, the mixed modified operator is $P_0^\dagger W_1^\dagger \mathcal{M}_2 W_1 P_0$, and the mixed modified operator is derived via the set of identities of elementary gate which is Id-GateREP.

19. The method of claim 14, according to the step of S5, wherein the merging operator is derived as $PW_1 P_0 = I_{2^k}$ or $P_0^\dagger W_2$ via Id-GateELIM, Id-GateEx and Id-GateREP.

20. The method of claim 14, according to the step of S6, wherein the one-way mixing encode is $U_{en} = (P_0^\dagger W_1^\dagger \mathcal{M}_2 W_1 P_0)(P_0^\dagger W_2) = P \mathcal{A} M Q_P^\dagger$.

* * * * *